Jan. 16, 1968 H. M. JENSEN 3,364,429

DEMODULATOR CIRCUIT INCLUDING COMPLEMENTARY TRANSISTORS AND MEANS FOR APPLYING FORWARD AND CUTOFF BIAS

Filed Jan. 15, 1965

HARVEY M. JENSEN
*INVENTOR.*

*BY* V. C. MULLER
ATTORNEY.

3,364,429

DEMODULATOR CIRCUIT INCLUDING COMPLEMENTARY TRANSISTORS AND MEANS FOR APPLYING FORWARD AND CUTOFF BIAS

Harvey M. Jensen, State College, Pa., assignor, by mesne assignments, to the United States of America as represented by the Secretary of the Navy Filed Jan. 15, 1965, Ser. No. 425,973
5 Claims. (Cl. 329—101)

ABSTRACT OF THE DISCLOSURE

A system including a sensing device such as a gyroscope for modulating a carrier signal; a transformer including a secondary winding having a grounded center tap for providing a pair of oppositely-phased reference voltages from the carrier signal; and a demodulator including a pair of complementary transistors having their bases receiving the modulated carrier signal from the sensing device by way of a pair of matched voltage dividers, first and second diodes receiving the reference voltages for forward biasing the collectors of the transistors during one half-cycle of the carrier signal, third and fourth diodes also receiving the reference voltages for applying cutoff bias to the bases of the transistors during the other half-cycle of the carrier signal and a smoothing filter connnected across a resistor to the emitters of the transistors for providing to a recording unit such as a galvanometer an output signal varying in polarity and magnitude in accordance with the relative phase and amplitude of the modulated carrier signal provided by the gyroscope.

This invention relates to demodulators and in particular to phase-sensitive demodulators for driving translating devices.

It is a common practice in the art of instrumentation to use sensing devices such as gyroscopes, synchromechanisms, transducers, and the like which provide modulated carrier-frequency output signals having relative phase and amplitude characteristics dependent upon the sense and magnitude, respectively, of the sensed changes. The modulated signal must then be demodulated in order to obtain a current corresponding to the sensed change and suitable to operate a translating device such as an oscillograph. Prior art demodulators used for this purpose are comparatively large and costly due to the necessity of using separate transformers for balancing or for isolation purposes; further, such demodulators must generally employ an input transformer or other means presenting a low impedance input characteristic, and the sensing device is thereby "loaded down," decreasing the system sensitivity.

The circuit herein described eliminates both the need for separate transformers and the low impedance input typical of prior art demodulator circuits.

It is therefore an object of this invention to provide an improved demodulator circuit.

It is a further object of this invention to provide a demodulator circuit having a comparatively high impedance input characteristic.

It is yet another object of this invention to provide circuit means enabling reference carrier and biasing voltages to be supplied to several demodulators from a single transformer.

These and other objects will become apparent upon reading the following description in conjunction with the appended drawings in which.

Figure 1:
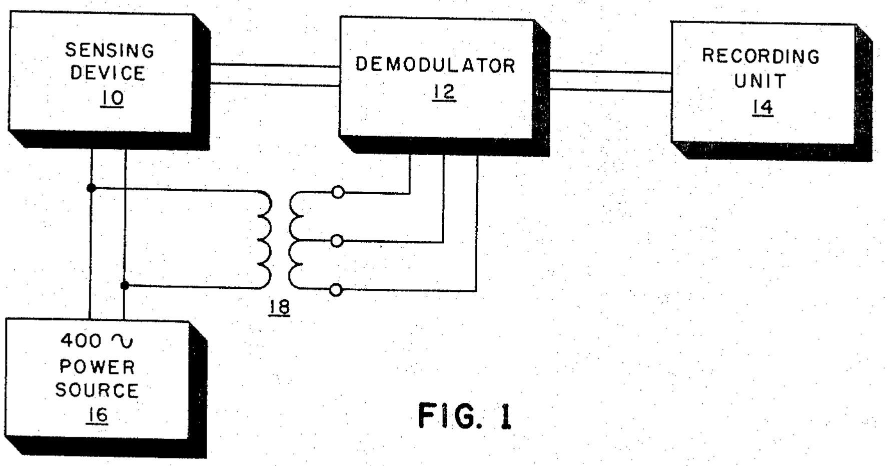
FIG. 1 is a block diagram of a system utilizing the invention.

Referring now to FIG. 1, sensing device 10 represents a gyroscope, depth-sensing mechanism or other transducer having an associated pick-off circuit providing, in conventional manner, a modulated carrier output signal (sometimes termed a suppressed carrier signal) which is either in phase-correspondence or phase-opposition with a carrier supply source signal, dependent upon the sense of change experienced by the transducer, and which is of amplitude corresponding to the magnitude of the detected change. The output of the sensing device 10 is applied to demodulator 12 wherein the signal is converted to a current of sense and magnitude corresponding to that of the detected change. The output signal of demodulator 12 is then applied to recording unit 14 which may be of oscillograph type or simply a measuring device such as a galvanometer. Power supply 16 is a source of carrier-frequency voltage which is applied to both sensing device 10 and demodulator 12. The only power needed by demodulator 12 is that supplied by the carrier-frequency source 16. Transformer 18 is shown as supplying only one demodulator but, due to the novel design of this invention, several demodulators may be supplied from one such transformer thereby eliminating one of the major drawbacks inherent in prior art systems.

Figure 2:
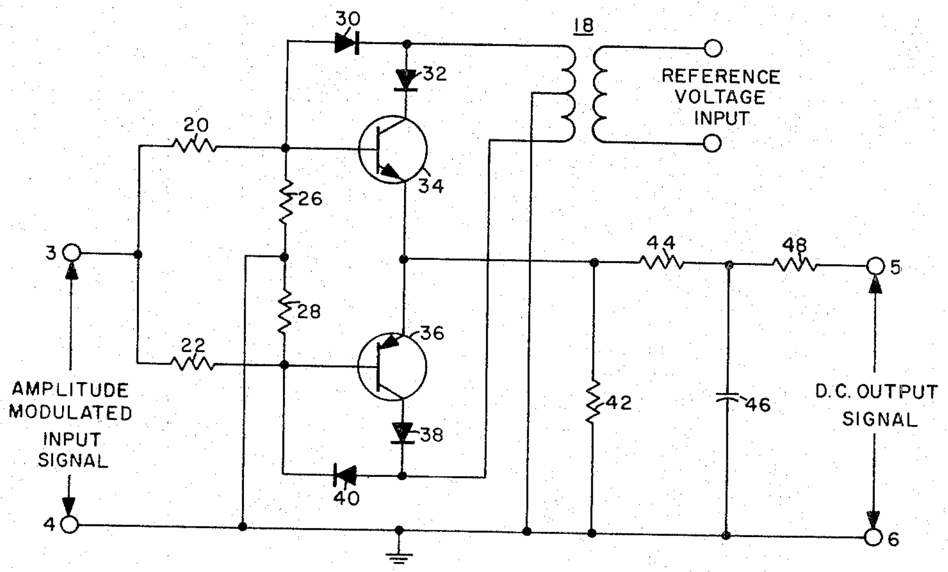
FIG. 2 is a schematic circuit of the invention.

FIG. 2 is a schematic of the invention showing input terminal 3 connected to one end of matching resistors 20 and 22. The other end of resistor 20 is in turn connected to one end of resistor 26, the base electrode of transistor 34 and one end of diode 30. Resistor 22 has the other end connected to one end of resistor 28, the base electrode of transistor 36 and one end of diode 40. The other ends of resistors 26 and 28 are connected together and thence to ground. The collector electrode of transistor 34 is connected through diode 32 to the other end of diode 30 and one side of the secondary winding of transformer 18. The collector electrode of transistor 36 is connected through diode 38 to the other end of diode 40 and to the other side of the secondary winding of transformer 18. The center tap of the secondary winding of transformer 18 is connected to ground.

The emitter electrodes of transistors 34 and 36 are connected together, through resistor 42 to ground, and through resistor 44 to resistor 48 leading to terminal 5. Capacitor 46 is connected between ground and the junction of resistors 44 and 48. Input terminal 4 and output terminal 6 are both at ground potential.

Functionally, the device is comprised of a pair of complementary transistors 34 and 36 of NPN and PNP types, respectively, the base electrodes of each being connected through matched voltage dividers to input terminal 3. The voltage dividers are formed by precision matched resistors 20, 22, 26 and 28 which cause identical signals to appear at the base electrode of each transistor. Conduction of either transistor 34 or 36, depending upon the sense of change experienced by sensing device 10 and correspondingly the phase of the input signal relative to the reference voltage, occurs during every other half-cycle (here termed the positive half-cycles) as a result of application of forward bias voltage from the transformer 18 secondary through diodes 32 and 38 to the collector electrodes of transistors 34 and 36, respectively. During the other (negative) half-cycles, both transistors are biased to cutoff through diodes 30 and 40 and resistors 26 and 28. The polarity of the output current is dependent upon which transistor conducts, correspondingly upon the in-phase or opposed-phase condition of the input signal relative to the reference voltage, and thus upon the sense of change experienced by sensing device 10.

The output of the transistors is taken from the common junction of the emitter electrodes of transistors 34 and 36 and filtered through an RC network formed by resistors 44 and 48 and capacitor 46; resistor 42 determines the proportionality factor between the input signal and the output current to recording unit 14.

The demodulator is powered from the same source of carrier frequency voltage as that used to supply the sensing device. A transformer 18 having a center tapped secondary winding is used to supply bias voltages to the transistors; the non-floating (grounded) center-tapped secondary winding arrangement enables more than one demodulator to be supplied from the same transformer.

In operation, a sensing device, such as a gyroscope, produces an amplitude modulated signal in which the percent modulation is a measure of the rate of turn, azimuth, attitude or the like. In the case of a gyro whose purpose is to detect and measure a rate of turn, a right turn, for example, would produce an amplitude modulated signal which is in phase with the reference supply while a left turn would result in a signal which is 180° out-of-phase with the reference supply. Inversion of the phase of the modulated signal results in a demodulator output signal of opposite polarity.

The output from the sensing device is applied to input terminals 3 and 4. From this point, the signal divides and is impressed on the bases of transistors 34 and 38. A study of FIGS. 1 and 2 will make it apparent that since the sensing device is supplied from the same source as transformer 18, the incoming signal is either in-phase or 180° out-of-phase with the reference carrier-frequency voltage supplied by the secondary winding of transformer 18. When the input is in phase with the reference voltage, both the base and collector of transistor 34 will be positive at the same time and transistor 34 will conduct during the positive half of the reference voltage cycle. When the sensing device produces a signal which is 180° out-of-phase with the reference voltage, transistor 36 will conduct during the negative half of the cycle, since both the base and collector are negative at the same time, a necessary biasing condition for a PNP transistor.

The signal appearing at the emitter of the conducting transistor is similar to a half-wave rectified A.C. signal. This signal is then filtered through the RC network formed by resistors 44 and 48 and capacitor 46. The output appearing across output terminals 5 and 6 is suitable for a recording device such as an oscillograph.

By way of example, for use in a system as in FIG. 1 powered by a 400 c.p.s. carrier-frequency voltage source, component specifications which have been found suitable for a demodulator presenting an input impedance of 3000 ohms and providing output currents ranging up to 10 microamperes for inputs ranging up to 10 volts are as follows:

| | | |
|---|---|---|
| Transistor 34 | | 2N35 |
| Transistor 36 | | 2N34 |
| Diodes 30, 32, 38, 40 | | 1N461 |
| Resistors 20, 22 | ohms | 4700 |
| Resistors 26, 28 | do | 1500 |
| Resistor 42 | do | 10000 |
| Resistor 44 | do | 1000 |
| Resistor 48 | do | 33000 |
| Capacitor 46 | mf | 1.0 |

While the invention has been disclosed in terms of an exemplary embodiment, obviously many modifications and variations thereof are possible in the light of the above teachings. It is therefore to be understood that within the scope of the appended claims the invention may be practiced otherwise than as specifically described.

What is claimed is:

1. A phase-sensitive half-wave demodulator for operating upon a suppressed carrier type of modulated input signal, delivered by a pickoff system energized by a carrier-frequency voltage, to derive therefrom an output signal varying in polarity and magnitude in accordance with the phase and amplitude of said input signal, said demodulator comprising, in combination:

(a) a pair of complementary transistors each having base, emitter and collector electrodes;

(b) a transformer having its primary energized by said carrier-frequency voltage and having a center-tapped secondary at whose opposite ends are developed oppositely-phased reference carrier-frequency voltages relative to said center-tap;

(c) an input circuit supplying said modulated input signal to said base electrodes relative to a common reference lead;

(d) an output circuit connected at one end to said emitter electrodes and at the other end to said reference lead;

(e) said transformer secondary center-tap being connected to said reference lead and thereby through said output circuit to said emitter electrodes;

(f) first and second diodes each connected between a respective one of said transformer secondary ends and a respective one of said collector electrodes, said first and second diodes being suitably poled to simultaneously effect application of forward bias to said collector electrodes relative to said emitter electrodes during one half-cycle of said carrier-frequency voltage; and (g) third and fourth diodes each connected between a respective one of said transformer secondary ends and a respective one of said base electrodes, said third and fourth diodes being suitably poled to simultaneously effect application of cutoff bias to said base electrodes during the other half-cycle of said carrier-frequency voltage.

2. A phase-sensitive half-wave demodulator as defined in claim 1, wherein said input circuit includes a pair of matched voltage divider networks.

3. A phase-sensitive half-wave demodulator as defined in claim 1, wherein said output circuit includes a smoothing filter.

4. A phase-sensitive half-wave demodulator for operating upon a suppressed carrier type of modulated input signal, delivered by a pickoff system energized by a carrier-frequency voltage, to derive therefrom an output signal varying in polarity and magnitude in accordance with the phase and amplitude of said input signal, said demodulator comprising, in combination:

(a) a pair of complementary transistors each having base, emitter and collector electrodes;

(b) means supplying said input signal to said base electrodes in like phase and amplitude relative to a common reference lead;

(c) said emitter elements being connected through an output resistor to said reference lead;

(d) means for simultaneously effecting application of forward bias to said collector electrodes relative to said emitter electrodes during one half-cycle of said carrier-frequency voltage; and (e) means for effecting application of cutoff bias to said transistors during the other half-cycle of said carrier-frequency voltage.

5. A phase-sensitive half-wave demodulator for operating upon a suppressed carrier type of modulated input signal, delivered by a pickoff system (10) energized by a carrier-frequency voltage source, said demodulator comprising, in combination:

(a) a pair of complementary transistors (34, 36) each having a base, an emitter, and a collector, said emitters being connected together;

(b) a pair of matched voltage divider networks connected in parallel between ground and the pickoff system, each said network including a pair of serially connected resistors (20 and 26, 22 and 28) which are connected to the base of a respective transistor at their junction for supplying the modulated input signal thereto;

(c) a transformer (18) having a primary winding energized by the carrier-frequency voltage source and having a secondary winding including a grounded center tap for developing at its ends oppositely-phased reference carrier-frequency voltages;

(d) first and second diodes (32, 38) each connected between a respective end of said secondary winding and a respective one of said collectors and each poled for providing forward bias to said collectors during one-half cycle of said carrier-frequency voltage;

(e) third and fourth diodes (30, 40) each connected between a respective end of said secondary winding and a respective one of said bases and each poled for providing cutoff bias to said bases during the other half-cycle of said carrier-frequency voltage;

(f) a resistor (42) connected between said emitters and ground; and (g) a smoothing filter (44, 46, 48) connected between said emitters and an output terminal for filtering the signal appearing at said emitters and for providing at the output terminal a demodulator output signal varying in polarity and magnitude in accordance with the phase and amplitude of the modulated input signal.

References Cited

UNITED STATES PATENTS

| | | | |
|---|---|---|---|
| 2,827,611 | 3/1958 | Beck | 329—101 |
| 3,096,492 | 7/1963 | Vogt | 329—101 X |
| 3,305,796 | 2/1967 | Somer et al. | 332—44 |

ALFRED L. BRODY, *Primary Examiner.*